US008369611B2

(12) United States Patent
Huo et al.

(10) Patent No.: US 8,369,611 B2
(45) Date of Patent: Feb. 5, 2013

(54) COMPACT HANDWRITING RECOGNITION

(75) Inventors: Qiang Huo, Beijing (CN); Yongqiang Wang, Hefei (CN)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 12/765,247

(22) Filed: Apr. 22, 2010

(65) Prior Publication Data

US 2011/0262033 A1 Oct. 27, 2011

(51) Int. Cl.
*G06K 9/62* (2006.01)
*G06K 9/00* (2006.01)

(52) U.S. Cl. .................... 382/161; 382/187
(58) Field of Classification Search .......... 382/159–161, 382/187–189, 224, 232, 181
See application file for complete search history.

(56) References Cited

U.S. PATENT DOCUMENTS

| 5,754,681 | A | 5/1998 | Watanabe et al. |
| 7,327,883 | B2 | 2/2008 | Polonowski |
| 2008/0298691 | A1 | 12/2008 | Zhang et al. |
| 2009/0304296 | A1 | 12/2009 | Zhang et al. |

OTHER PUBLICATIONS

McDermott; et al., "Discriminative Training for Large-Vocabulary Speech Recognition Using Minimum Classification Error"—Published Date: 2007, http://ieeexplore.ieee.org/stamp/stamp.jsp?arnumber=04032780.
Long; et al., "Building Compact MQDF Classifier for Off-line Handwritten Chinese Characters by Subspace Distribution Sharing"—Published Date: 2007 http://www.hcii-lab.net/download/papers/2007/Building%20Compact%20MQDF%20Classifier%20for%20Off-line%20Handwritten%20Chinese%20Characters%20by%20Subspace%20Distribution%20Sharing.pdf.
Wang; et al., "Modeling Inverse Covariance Matrices by Expansion of Tied Basis Matrices for Online Handwritten Chinese Character Recognition"—Published Date: Dec. 2009 http://www.cenparmi.concordia.ca/ICFHR2008/Proceedings/papers/cr1062.pdf.
Wang; et al., "Design Compact Recognizers of Handwritten Chinese Characters Using"—Published Date: Jul. 26, 2009, http://www.cvc.uab.es/icdar2009/papers/3725a036.pdf.

*Primary Examiner* — Daniel Mariam
(74) *Attorney, Agent, or Firm* — Microsoft Corporation

(57) ABSTRACT

One or more techniques and/or systems are disclosed for constructing a compact handwriting character classifier. A precision constrained Gaussian model (PCGM) based handwriting classifier is trained by estimating parameters for the PCGM under minimum classification error (MCE) criterion, such as by using a computer-based processor. The estimated parameters of the trained PCGM classifier are compressed using split vector quantization (VQ) (e.g., and in some embodiments, scalar quantization) to compact the handwriting recognizer in computer-based memory.

20 Claims, 8 Drawing Sheets

COMPACT HANDWRITING RECOGNITION

BACKGROUND

Computer-based handwriting recognition systems, can be used for characters that are written directly onto a touch sensitive input (e.g., screen), and/or for characters scanned from a written document. When characters are written onto a screen for example, to be recognized (e.g., and digitized) it is often referred to as online recognition. East Asian written languages, such as Chinese, Japanese, and Korean, can comprise thousands of characters. Recognition systems usually comprise a character classifier that compares the written unknown sample against a trained model. Users of the handwriting recognizers prefer that it yields accurate results; however, as a number of potential characters increases, memory requirements for storing such a classifier also increase.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Currently, classifiers often use a modified quadratic discriminant function (MQDF) model. Typically, when using the MQDF-model the classifier assumes that the feature vectors of each character class can be modeled by a Gaussian distribution with a mean vector and a full covariance matrix. In order to achieve reasonably high recognition accuracy (e.g., an effective classifier), a large enough number of leading eigenvectors of the covariance matrix have to be stored. This requires a significant amount of memory to store the relevant model parameters. Further, when using the classifier for EA written languages, even more memory may be required due to the thousands of potential characters.

Typically, handwriting recognizers that yield higher accuracy require more memory. However, handwriting recognizers are often implemented on mobile devices. As a result, recognition accuracy can be dramatically reduced when implementing an MQDF-based recognizer in a computing device, such as a mobile device, that has limited memory.

One or more techniques and/or systems are disclosed that provide for improved accuracy while mitigating an amount of memory used to store the recognizer. That is, for example, a handwriting recognizer may be constructed that uses less memory while providing improved recognition accuracy, by using an alternate to the MQDF approach.

In one embodiment for constructing a compact handwriting character classifier, a precision constrained Gaussian model (PCGM) based handwriting classifier, such as for use for EA written languages, is trained by estimating parameters for the PCGM under minimum classification error (MCE) criterion. Further, the estimated parameters for the PCGM can then be compressed for storage using split vector quantization (VQ), thereby compacting the handwriting recognizer, for example, in memory.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
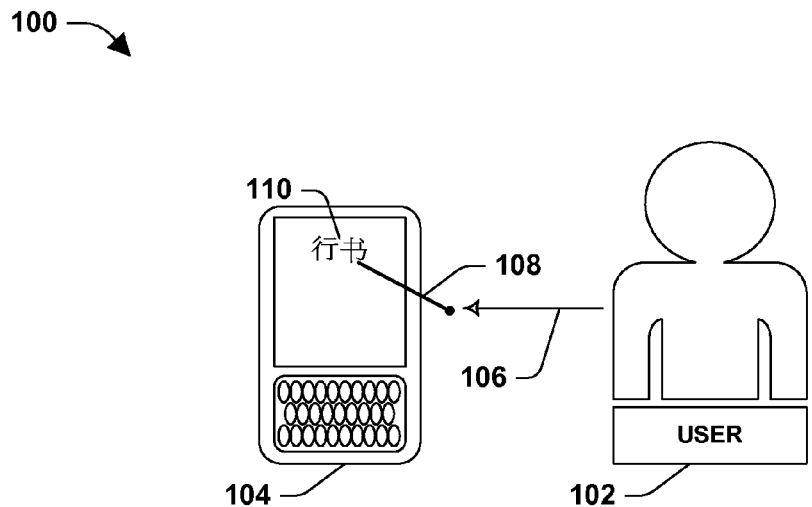
FIG. 1 illustrates an example environment in which one or more techniques, described herein, may be implemented.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 illustrates an example environment 100 in which one or more techniques, described herein, may be implemented. Applications employed by a mobile device 104, such as a smart phone, tablet computer, etc., may allow a user 102 to interact 106 by handwriting characters 110 directly onto an interaction area (e.g., screen), such as by using a stylus 108. For example, the user 102 may wish to take notes on the mobile device 110 in lieu of typing using a small keyboard, or the device may not employ a hard keyboard. Often, the handwritten notes can be recognized and converted to computer-based typewritten text, for example, to be organized in a word processing document. Typically, these types of recognizers perform online recognition that occurs automatically as the text is written.

As an example, a handwritten character 110 may be entered 106 using an input device, such as a touch-screen digitizer 104 and stylus 108. A recognizer application resident on the device 104 receives the ink data (e.g., comprising the strokes and timing, known as trajectory data), from which features are extracted from the unknown characters 110. Typically, a trained handwriting recognizer matches the unknown characters' features to features of known characters (e.g., stored as classification data from training). The recognizer may calculate similarity scores for each known character, and a decision rule can select the character class having a highest score, for example, and output it as a recognized character. Similarly, the recognizer may output more than one character depending on the application and settings, such as by creating a list of most likely characters.

A method may be devised that facilitates development of a compact recognizer of handwriting. For example, because eastern Asian (EA) written languages, such as Chinese, Japanese and Korean, can comprise thousands of unique characters, effective handwriting recognizers typically require large amounts of memory for storage (e.g., flash) and processing (e.g., RAM). Due to this memory limitation, mobile handwriting recognizers that have high (e.g., effective) recognition rates, particularly for EA written languages, are limited.

Figure 2:
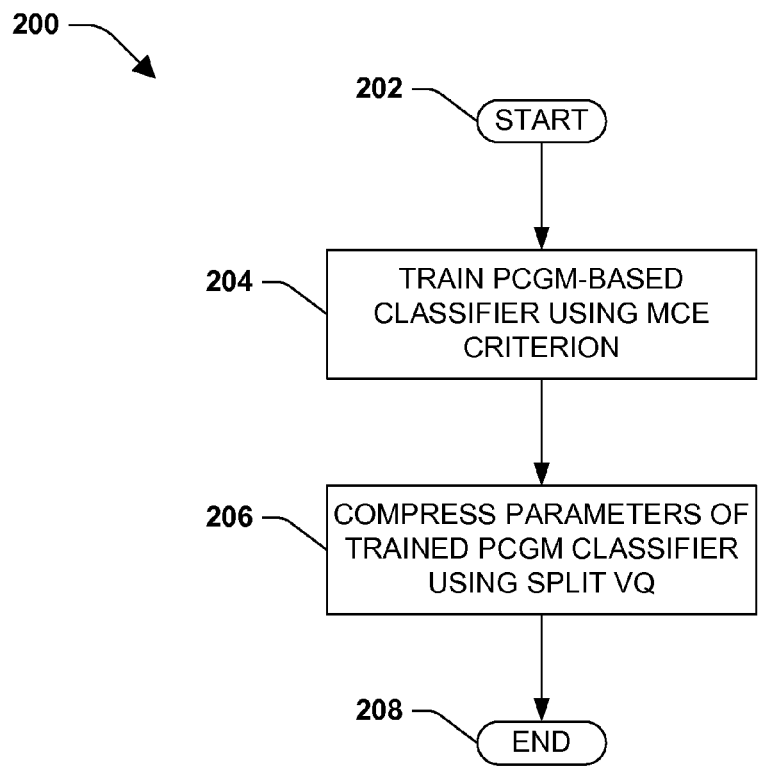
FIG. 2 is a flow diagram of an exemplary method for constructing a compact handwriting character classifier.

FIG. 2 is a flow diagram of an exemplary method 200 for constructing a compact handwriting character classifier, such as to be employed in a mobile device for online recognition of EA written languages. The exemplary method 200 begins at 202 and involves training a precision constrained Gaussian model (PCGM) based handwriting classifier by estimating parameters for the PCGM under minimum classification error (MCE) criterion, at 204.

As an example, in the PCGM the feature vectors of respective character classes $C_j$ can follow a Gaussian distribution (e.g., a normal distribution) $p(x|C_j)=N(x; \mu_j, \Sigma_j)$, where mean $\mu_j$ has no constraint imposed, while precision matrix $P_j=\Sigma_j^{-1}$ lies in a subspace spanned by a set of basis matrices (e.g., prototypes) which may be denoted as $\psi=\{S_k|l=1,\ldots,L\}$, which are shared by the character classes. Consequently, in this example, the precision matrix $P_j$ can be written as:

$$P_j \triangleq \sum_{l=1}^{L} \lambda_{jl} S_l$$

where $\lambda_{jl}$'s are class-dependent basis coefficients and L is a control parameter. In this example, the basis matrices $S_l$'s are symmetric and are not required to be positive definite, whereas $P_j$'s are positive definite.

In one embodiment, in order to train the PCGM-based handwriting classifier, parameters (e.g., settings) of the model are estimated. That is, for example, the model can typically yield observations, but the settings are unknown. As an example, a set of PCGM parameters $\Theta$ can comprise a subset of tied parameters $\Theta_{tied}=\psi$ and a subset of untied parameters $\Theta_{untied}=\{\mu_j, \Lambda_j; j=1\ldots M\}$ where $\Lambda_j=(\lambda_1^j,\ldots,\lambda_L^j)^T$, and M is a number of character classes. In one embodiment, a total number of parameters of the PCGMs can be far less than that of other models used for classification (e.g., modified quadratic discriminant function (MQDF)).

In the exemplary embodiment 200 of FIG. 2, the parameters are estimated under MCE criterion. That is, for example, MCE can be used in pattern classification systems, where an aim of MCE training is to minimize resulting classification error when attempting to classify a new data set against a statistical model. Here, in this embodiment, the statistical model used to describe the data is the PCGM, and the data set can comprise a set of training data, such as labeled, known characters from different character classes.

In the exemplary method 200 of FIG. 2, at 206, the parameters of the trained PCGM classifier are compressed using split vector quantization (VQ). That is, for example, the estimated parameters for the PCGM are compacted and stored in computer-based memory in order to reduce the handwriting recognizer. In this way, in this example, the reduced total number of parameters of the PCGMs, when compared with other models, combined with the parameter compression can provide an effective handwriting classifier that has a small enough footprint to be used in mobile devices.

As an example, VQ is a lossy compression method based on block coding that uses a fixed-to-fixed length algorithm to compress data. In one embodiment, a Linde, Buzo and Gray (LBG) training sequence can be used to design a VQ for data, where the training data comprises source vectors, such as from the training data described above. As a further example, the split VQ can comprise splitting a set of parameters into subsets, then performing the LBG VQ compression on the subsets.

In the exemplary method 200 of FIG. 2, having compressed the parameters of the trained PCGM classifier, the exemplary method 200 ends at 208.

Figure 3:
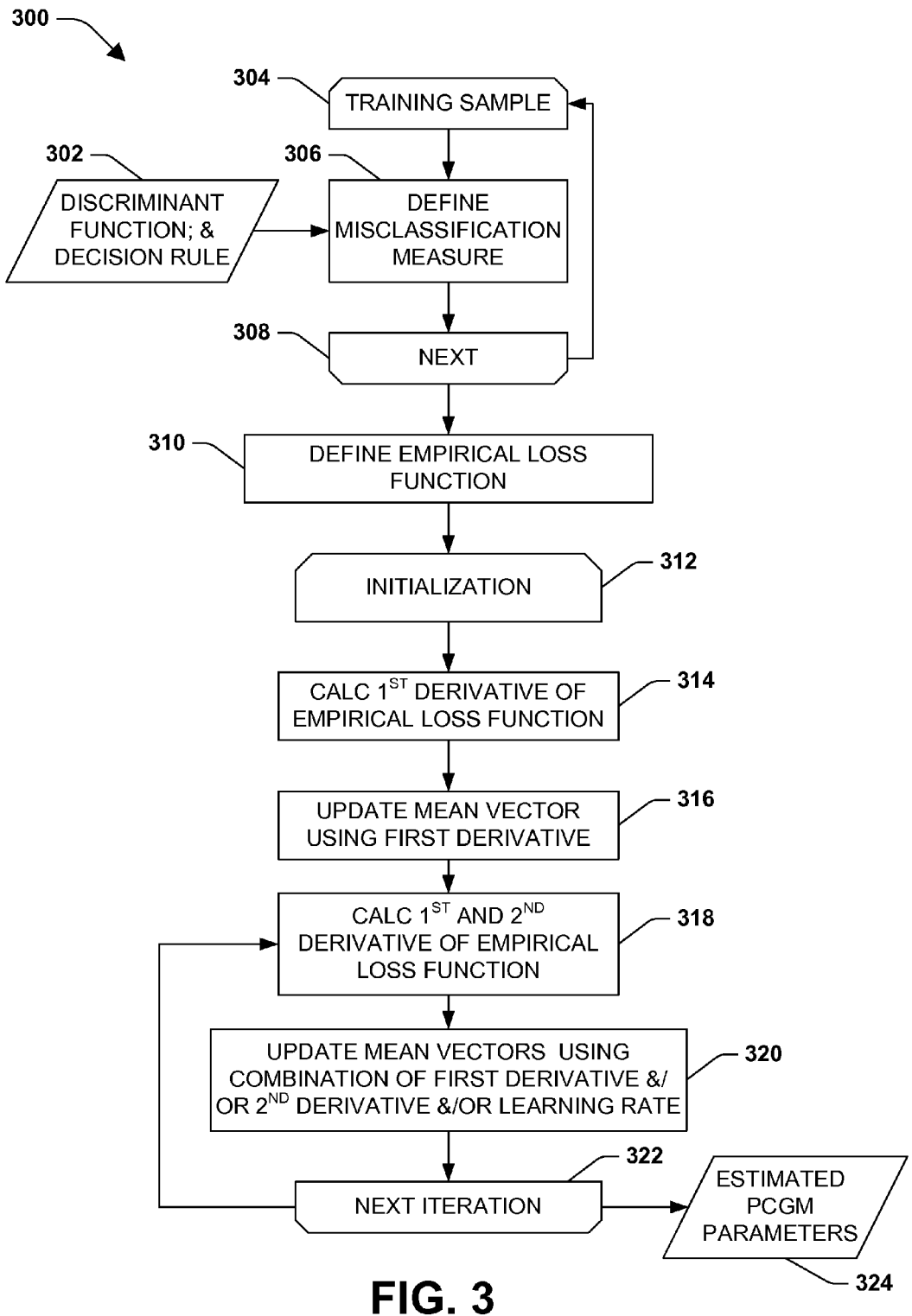
FIG. 3 is a flow diagram illustrating one exemplary embodiment of training a PCGM under minimum classification error criterion.

FIG. 3 is a flow diagram illustrating one exemplary embodiment 300 of training a PCGM under minimum classification error criterion. At 304, for respective training samples, such as labeled, known characters, a misclassification measure is defined, at 306, using a discriminant function and decision rule 302. A discriminant function is a nonlinear function of discriminating variables, which can be generated from a set of samples, for which the character class is known. The functions can be applied to unknown samples with measurements on a same set of variables, but unknown character class membership.

For example, a discriminant function of a PCGM can be derived from the following log likelihood function for an unknown feature vector x as:

$$g_j(x; \Omega) = \left[\log\det\left(\sum_{l=1}^{L} \lambda_{jl} S_l\right) - \sum_{l=1}^{L} \lambda_{jl}(x-\mu_j)^T S_l (x-\mu_j)\right]$$

where:

$$\Omega=\{\mu_j, \lambda_{jl}|j=1,\ldots,M; l=1,\ldots,L\}\cup\Psi.$$

Further, as an example, a known maximum discriminant decision rule, such as:

$$x \in C_j \text{ if } j = \arg\max_w g_w(x)$$

can then be used for defining the misclassification measure for respective observations in the training stage. In this example, $g_w(x)$ is the discriminant function of the PCGM. The misclassification measure, for example, can embed a decision process in the MCE formulation and characterize a degree of confidence in making decisions for an observation. In one embodiment, the misclassification measure is a differentiable function of the classifier parameters.

In one embodiment, given the discriminant function and decision rule, described above, the misclassification measure for respective training samples $x_r$ can be defined as:

$$d_r(x_r; \Omega) = -g_{i_r}(x; \Omega) + G_{i_r}(x; \Omega)$$

where $$G_j(x; \Omega) = \frac{1}{\eta}\log\left[\frac{1}{M-1}\sum_{n,n\neq j}\exp[\eta g_n(x; \Omega)]\right]$$

with $\eta$ being a control parameter.

At 308, another training sample is analyzed, for example, until all of the training samples have been analyzed, in the loop 304-308.

At 310, for respective misclassification measures from the training samples, an empirical loss function is defined. In one embodiment, given the misclassification measure described above, the following empirical loss function, $l(\Omega; x)$, can be defined as:

$$l(\Omega; \chi) - \frac{1}{R}\sum_{r=1}^{R} \frac{1}{1+\exp(-\alpha d_r + \beta)}$$

where $\alpha$ and $\beta$ are two control parameters.

In this embodiment, the PCGM parameters $\Omega$ can then be estimated by minimizing the empirical loss function, starting at 312. In one embodiment, the Quickprop algorithm can be used to minimize the empirical loss function, as demonstrated in the 312-322 acts of the exemplary embodiment 300. In this embodiment, the training can comprise transforming merely mean vectors for the PCGM. In one embodiment, starting with maximum likelihood (ML) trained seed PCGM parameters, as initialized at 312, a Quickprop iterative procedure can be used to fine-tune merely the mean vectors $\{\mu_j\}$ for the training sample.

At 314, a first derivative of the empirical loss function is calculated, such as by calculating the derivative of $l(\Omega; X)$ with respect to each $\mu_{jd}$ (e.g., where $\mu_{jd}$ is the d-th element of $\mu_j$) as follows:

$$\frac{\partial l(\Omega^{(t)}; \chi)}{\partial \mu_{jd}} \triangleq$$

$$\frac{\partial l(\Omega; \chi)}{\partial \mu_{jd}}\bigg|_{\Omega=\Omega^{(t)}} = e_d^T P_j \left\{\frac{1}{R}\sum_{r=1}^{R}(1-(1+\kappa_{jr}\upsilon_r))1[i_r \neq j](x_r - \mu_j)\right\}$$

where $e_d$ is the d-th basis vector of Cartesian coordinate, $1[\ ]$ is the indicator function and $$\kappa_{jr} = \frac{\exp(\eta g_j(x_r; \Omega))}{\sum_{n, n \neq i_r} \exp(\eta g_n(x_r; \Omega))};$$

$$\upsilon_r = l_r(\Omega)(1 - l_r(\Omega)),$$

$$l_r = \frac{1}{1+\exp(-\alpha d_r + \beta)}.$$

At 316, the mean vector parameter $\mu_{jd}$ (e.g., the d-th element of the mean vectors) can be updated using the first derivative, such as:

$$\mu_{jd}^{(t+1)} = \mu_{jd}^{(t)}$$

$$\varepsilon_0 \frac{\partial l(\Omega^{(t)}; \chi)}{\partial \mu_{jd}}$$

where $\varepsilon_0$ is a first learning rate set empirically, that is combined with the first derivative.

At 318, given the updated mean vectors in the previous iteration 314-316, first and second derivatives of the empirical loss function are calculated, for respective mean vectors $\mu_{jd}$.

At 320, mean vectors are updated using a combination of first derivative and/or second derivative and/or a learning rate as $\mu_{jd}^{(t+1)} \leftarrow \mu_{jd}^{(t)} + \delta_t \mu_{jd}$, where $\delta_t \mu_{jd}$ denotes the update act of $\mu_{jd}$. In one embodiment, if the second derivative is greater than zero and a sign of gradient of the first derivative in the current iteration is different from a sign of the first derivative in the previous iteration; that is, for example, if $$\frac{\partial^2 l(\Omega^{(t)}; \chi)}{\partial \mu_{jd}^2} > 0$$

and the sign of derivative $$\frac{\partial l(\Omega^{(t)}; \chi)}{\partial \mu_{jd}}$$

differs from that of $$\frac{\partial l(\Omega^{(t-1)}; \chi)}{\partial \mu_{jd}},$$

then a Newton act can be used. In this embodiment, the update of the mean is performed by combining the first and second derivative. For example:

$$\delta_t \mu_{jd} = -\frac{\partial l(\Omega^{(t)}; \chi)}{\partial \mu_{jd}} \bigg/ \frac{\partial^2 l(\Omega^{(t)}; \chi)}{\partial \mu_{jd}^2}$$

where $\delta_t \mu_{jd}$ denotes the update act of $\mu_{jd}$.

In another embodiment, if the second derivative is greater than zero and the sign of gradient of the first derivative in the current iteration is the same as the sign of gradient of the first derivative in the previous iteration; that is, for example, if $$\frac{\partial^2 l(\Omega^{(t)}; \chi)}{\partial \mu_{jd}^2} > 0 \text{ and } \frac{\partial l(\Omega^{(t)}; \chi)}{\partial \mu_{jd}} \text{ and } \frac{\partial l(\Omega^{(t-1)}; \chi)}{\partial \mu_{jd}}$$

have the same sign of gradient, a modified Newton act can be used. In this embodiment, the update of the mean can be performed by combining the first derivative, the second derivative, and a second learning rate. For example:

$$\delta_t \mu_{jd} = -\left(1 \bigg/ \frac{\partial^2 l(\Omega^{(t)}; \chi)}{\partial \mu_{jd}^2} + \varepsilon_t\right)\frac{\partial l(\Omega^{(t)}; \chi)}{\partial \mu_{jd}}$$

where $\varepsilon_t$ is a second learning rate set by: $\varepsilon_t = \varepsilon_0(1-t/T)$, where T is a total number of iterations to be performed.

In another embodiment, if the second derivative is less than zero $$\left(e.g., \text{ if } \frac{\partial^2 l(\Omega^{(t)}; \chi)}{\partial \mu_{jd}^2} < 0\right),$$

or a magnitude of the update (e.g., $\delta_t \mu_{jd}$) is too small, the update act can be set by combining the first derivative with the second learning rate to perform an update of the mean. For example:

$$\delta_t \mu_{jd} = -\varepsilon_t \frac{\partial l(\Omega^{(t)}; \chi)}{\partial \mu_{jd}}.$$

In one embodiment, a size of the update act for the mean can be limited by a specified control parameter.

At 322, a decision is made whether the acts 318-320 aren repeated T−1 times, where T is a total number of iterations to be performed.

Having transformed the mean vectors for the training samples for the PCGM, the estimated PCGM parameters 324 are derived for the trained model.

In one aspect, in order to implement a PCGM-based recognizer that has been trained under MCE criterion particular parameters are stored for use by the recognizer. As described above, one of the limitations of mobile handwriting recognizers, particularly those used for EA handwritten characters, is that memory of a mobile device is limited. Therefore, reducing an amount of parameters stored is facilitated by using the PCGM. Further, in this aspect, compressing those parameters that are stored will also help reduce memory needs.

In one embodiment, a modified version of the discriminant function described above (e.g., modified for more efficient evaluation) can be used, such as:

$$g_j(x; \Omega) \triangleq \frac{1}{2}\left(c_j + 2x^T m_j - \sum_{l=1}^{L} \lambda_{jl} x^T S_l x\right)$$

where $c_j = \log \det P_j - \mu_j^T P_j \mu_j$, $m_j = P_j \mu_j$.

In this embodiment, using this discriminant function, three sets of parameters are stored to implement the PCGM-based recognizer: a set of transformed mean vectors (e.g., determined in FIG. 3) and constants $\{m_j, c_j\}$, for example, comprising a total of (D+1)×M raw parameters; a set of coefficients $\{\lambda_{jl}\}$, for example, a total of L×M raw parameters; and a set of prototypes $\Psi$, for example, a total of D(D+1)×L/2 raw parameters. As an example, if a 4-byte floating point number is used to represent the respective raw parameters, a total memory requirement is about 4×(D+L+1)×M+4×D(D+1)×L/2 bytes. This may translate to about 2.83 MB for a typical system setup of D=128, L=32, M≈3000, for example.

Figure 4:
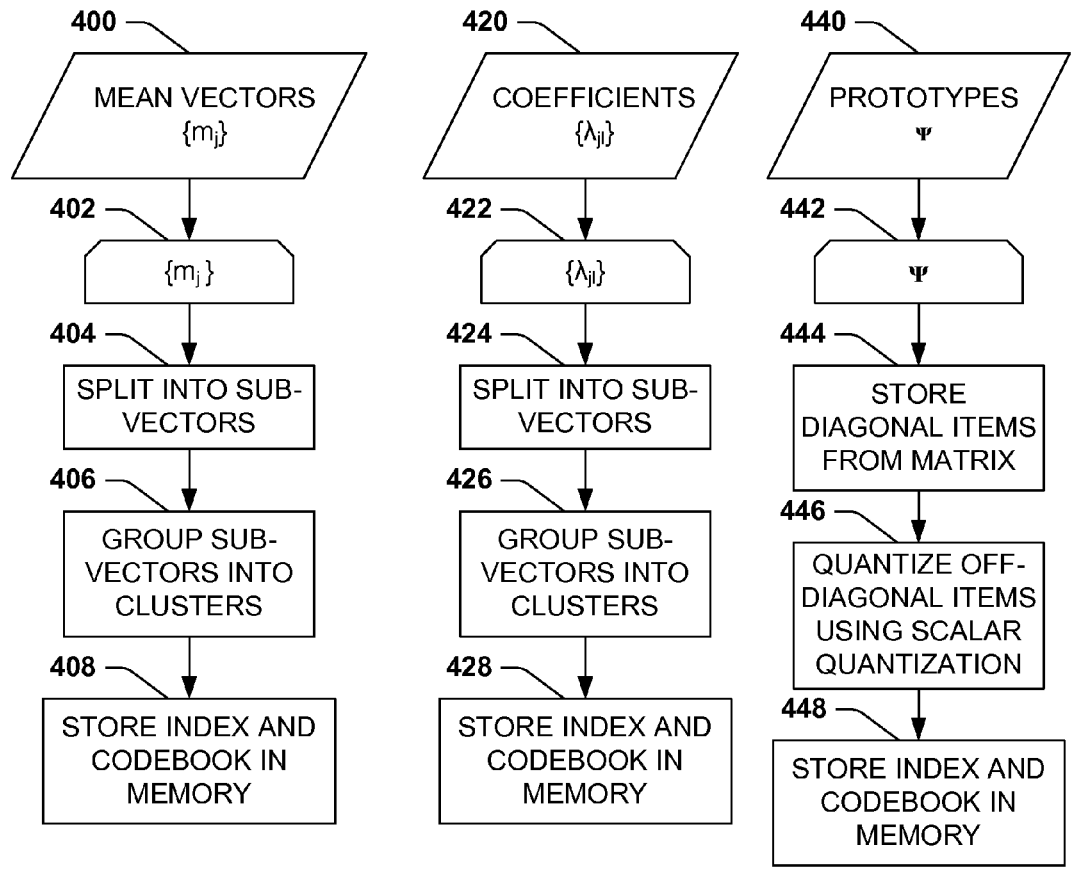
FIG. 4 is an illustration of exemplary embodiments of compressing parameters for a PCGM.

To compress the PCGM parameters, described in this embodiment, a split vector quantization (VQ) technique can be used. However, in one embodiment, parameters of the PCGM can also be compressed using scalar quantization. FIG. 4 is a series of three flow diagrams 400, 420 and 440 illustrating exemplary embodiments of compressing parameters for a PCGM. The flow diagrams 400 and 420 illustrate exemplary embodiments where the split-VQ technique is used to compress the parameters, and the flow diagram 440 illustrates an exemplary embodiment where scalar quantization is used to compress parameters.

In the flow diagram 400, the mean vectors $\{m_j\}$ 402 are compressed. At 404, respective transformed mean vectors $m_j \in R^D$, can be split into two or more streams of sub-vectors, for example, uniformly split into $Q_1$ $D_{Q_1}$-dimensional sub-vectors (e.g., D=$Q_1 \times D_{Q_1}$). At 406, the respective sets of sub-vectors from a stream can be grouped into clusters, in one embodiment, using the Linde-Buzo-Gray (LBG) algorithm.

The LBG algorithm is a vector quantization algorithm used in split-VQ to efficiently generate a codebook for the clustered data.

As an example, for each $q \in \{1, \ldots, Q_1\}$ the LBG algorithm can be used to group the set of sub-vectors $\{m_j^q | j=1, \ldots, M\}$ into 256 clusters, with Euclidean distance as the distortion measure, where $m_j^q$ is the q-th sub-vector of $m_j$. In one embodiment, after clustering the sub-vectors, the respective clusters comprise a centroid (e.g., the mean of the sub-vectors in the corresponding cluster). In this embodiment, the parameter vector (e.g., the mean vector) can be represented by multiple indices, which respectively correspond to an index of a codeword (e.g., centroid) to which a corresponding sub-vector is quantized (e.g., clustered).

For example, respective sub-vectors $m_j^q$ (e.g., which have been quantized to clusters) can be represented by an index of their nearest centroid (e.g., for the cluster to which they have been clustered). Further, in this embodiment, respective centroids (e.g., codewords), which can be a $D_{Q_1}$-dimensional vector, for example, may be represented by $D_{Q_1}$ 4-byte floating point numbers. Additionally, in this example, the respective index for the codeword can be represented as a single-byte, unsigned integer. In this example, a total of $Q_1 \times M$ bytes may be used to store the indices and 4×D×256 bytes to store the codebook, comprising the codewords (e.g., centroids).

Figure 5:
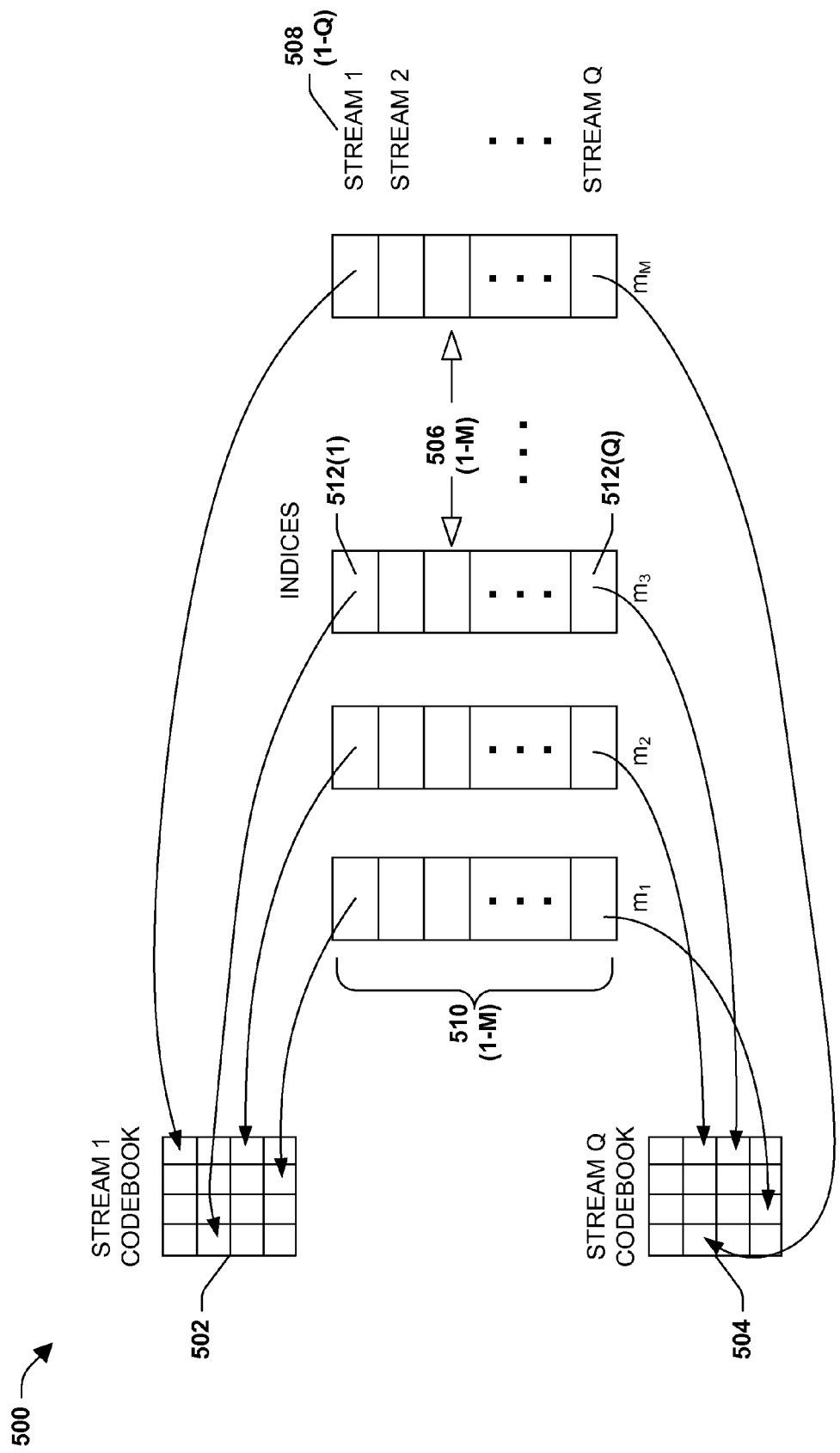
FIG. 5 illustrates an exemplary embodiment of a split VQ compression scheme.

FIG. 5 illustrates an exemplary embodiment 500 of this split VQ compression scheme. In this exemplary embodiment 500, the parameters 506(1-M) (e.g., mean vectors $m_1$-$m_M$) have been split into a plurality of sub-vectors 510(1-M). The respective sub-vectors correspond to streams 508(1-Q), where the respective sub-vectors have been clustered and representative centroids (e.g., codewords) selected. The respective sub-vectors are represented by an index 512(1-Q) of their closest centroid. The respective codewords are stored in a codebook (e.g., 502, 504, etc.), that corresponds to their stream 508(1-Q).

Returning to FIG. 4, at 408, the index and codebook for the mean vectors that have been compressed can be stored in memory, such as to be used by the PCGM-based handwriting recognizer. In this way, the parameters for the trained PCGM have been compressed in memory, such as flash memory on a mobile device, and can be used for handwriting recognition. Further, in one embodiment, the constants $c_j$ can also be quantized and compressed in a manner similar to that described above. Further, in one embodiment, the set of character-dependent constants $c_j$ can be compressed using scalar quantization. However, for example, storing the constants $c_j$ merely uses several kilobytes, so compression may not always be used.

In the flow diagram 420 of FIG. 4, coefficients 422, for example, $\{\lambda_{jl}\}$ can be compressed using the split VQ technique. The flow diagram 420 follows a same sequence of acts 424-428 as described above, which illustrates how the coefficients can be split into sub-vectors, grouped into clusters, and stored in memory as indices and codebooks. As an example, the coefficients $\{\lambda_{jl}\}$ can be split uniformly $\Lambda_j = (\lambda_{j1}, \ldots, \lambda_{jL})^T$ into $Q_2$ $D_{Q_2}$-dimensional sub-vectors (e.g., L=$Q_2 \times D_{Q_2}$). Further, for each $q \in \{1, \ldots, Q_2\}$, a set of sub-vectors $\{\Lambda_j^q | j=1; \ldots; M\}$ can be grouped into 256 clusters, where $\Lambda_j^q$ is the q-th sub-vector of $\Lambda_j$. Therefore, for example, merely $Q_2 \times M + 4 \times L \times 256$ bytes may be needed to store the coefficients.

The flow diagram 440, of FIG. 4, illustrates an exemplary embodiment of compressing parameters using scalar quantization. Scalar quantization can approximate a range of values (e.g., a set of possible discrete values) using a small set of discrete symbols or values. For example, the prototypes $\psi=\{S_1, \ldots, S_L\}$ can comprise symmetrical basis matrices for the PCGM. For each prototype $S_j$, at 442, because they are symmetric, merely diagonal and upper-diagonal items from the matrix can be stored to represent the prototype.

As an example, diagonal items in the basis matrix of the prototype may reflect an auto-correlation of elements in the feature vector, and can have a dynamic range significantly different from that of upper-diagonal items. Therefore, at 444, the diagonal items from a set of character-dependent symmetrical basis matrices are stored, for example, each represented by a 4-byte floating point number. Further, at 446, the upper-diagonal items from the set of character-dependent symmetrical basis matrices are compressed using scalar quantization. For example, the upper-diagonal items can be quantized using an 8-bit scalar quantization. As an example, storing the prototypes in this manner utilizes merely D(D−1)×L/2+256×4+D×L×4 bytes of memory. At 448, the index and codebook created by the quantization can be stored in memory.

Figure 6:
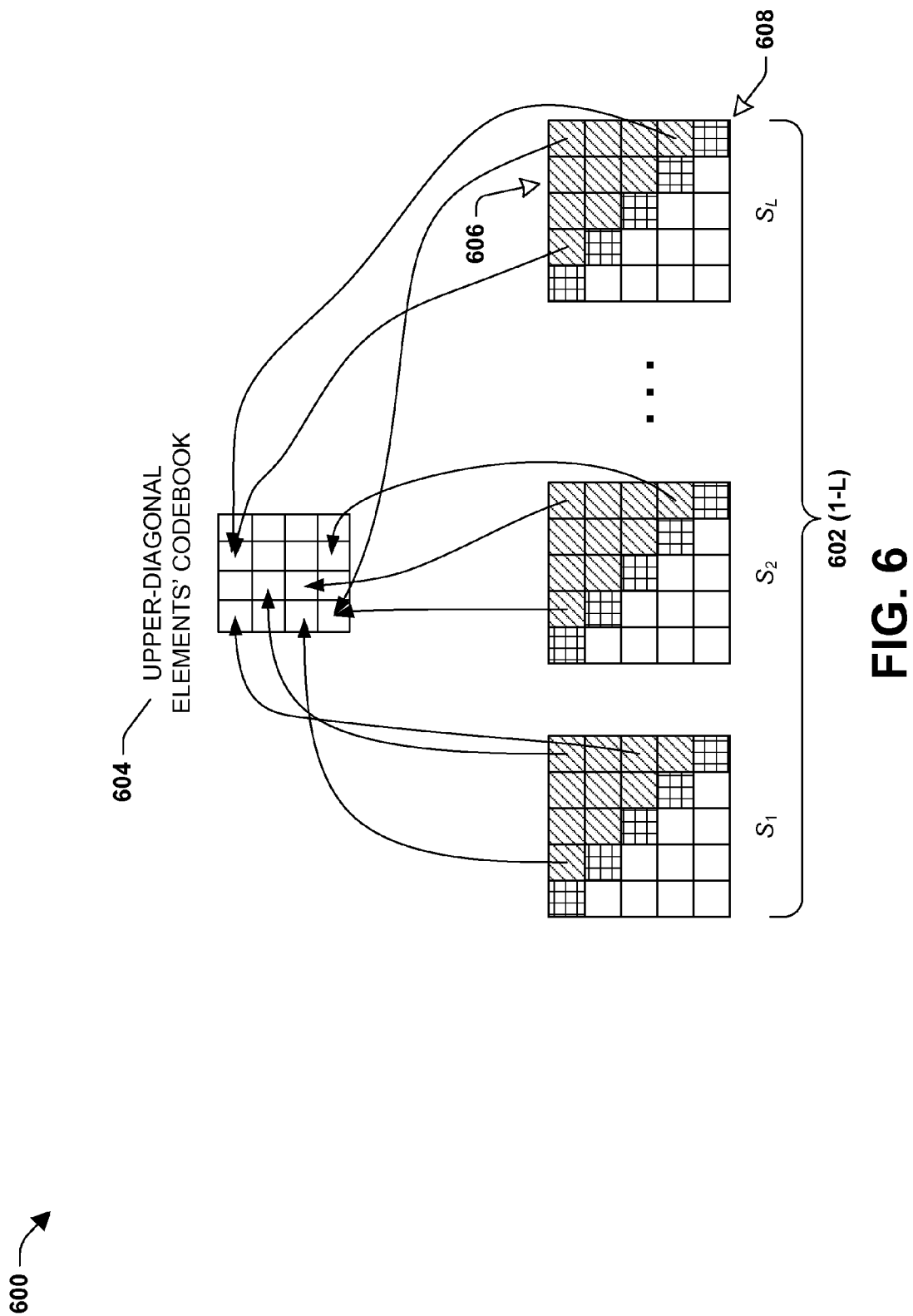
FIG. 6 is an illustration of an exemplary embodiment of an implementation of scalar quantization.

FIG. 6 is an illustration of an exemplary embodiment 600 of this type of compression, implementing scalar quantization. The respective basis matrices 602 (1-L), for example, of the prototypes, comprise upper-diagonal 606 and diagonal items 608. In this example respective item (e.g., 606) in the matrices 602 (1-L) can comprise indices that correspond to centroids. The respective centroids can be stored as codewords in a codebook 604, in this example, where merely those codewords from the upper diagonal items 606 are stored in the codebook 604. In this way, as an example, the matrices 602 (1-L) are compressed by the scalar quantization. In one embodiment, the indices and codebooks can be stored in computer-based memory, such as for use in the handwriting recognizer on a mobile device.

Figure 7:
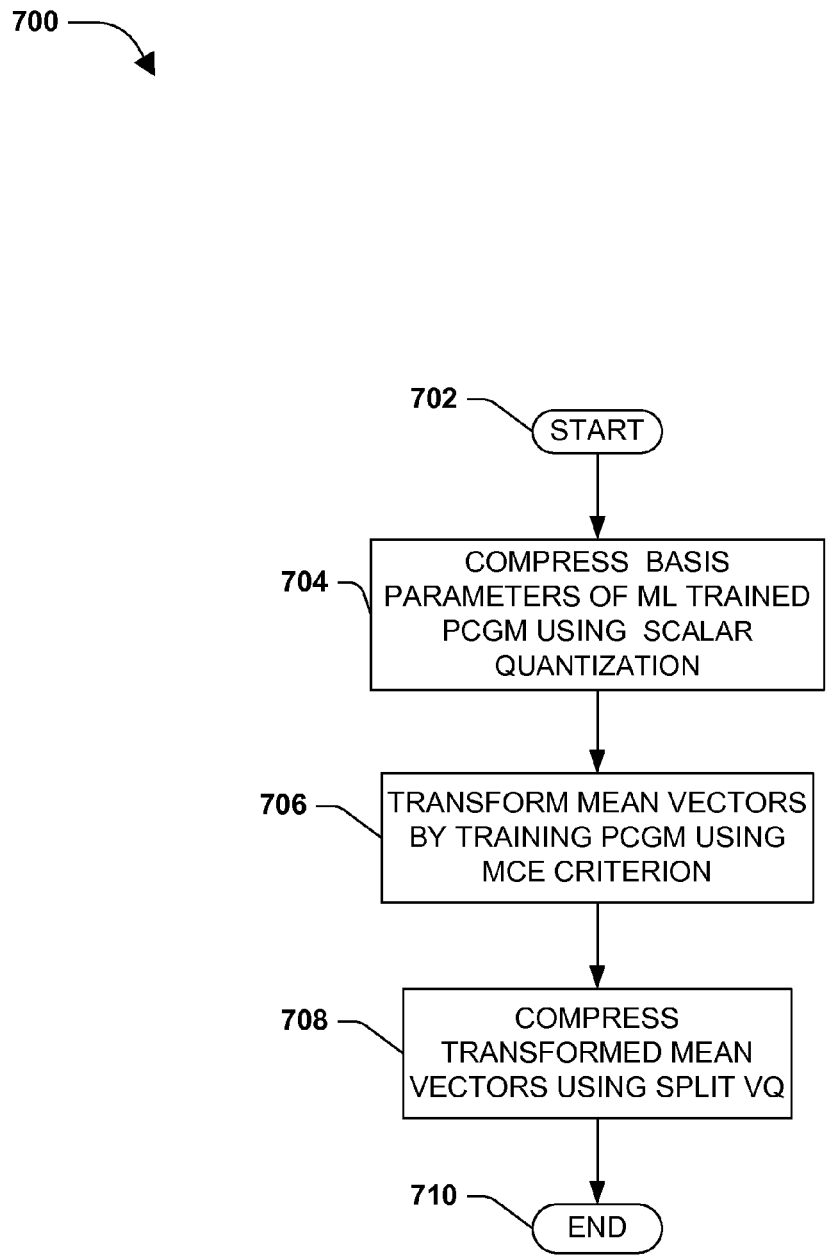
FIG. 7 is a flow diagram of an exemplary method for creating a compact recognizer.

An alternate method may be devised for constructing a compact handwriting recognizer, for example, by using compression of parameters and a precision constrained Gaussian model (PCGM). FIG. 7 is a flow diagram of an exemplary method 700 for creating a compact recognizer. The exemplary method 700 begins at 702 and involves compressing character-independent basis parameters of a maximum likelihood (ML) trained precision constrained Gaussian model (PCGM) using scalar quantization, at 704.

ML training of statistical models merely provides parameters for the model that will yield data that is "more likely" to be correct than other parameter values may provide. In other words, a mean determined from a sample sub-set of all values, if it has a normal distribution, may be a maximum likelihood estimator for the mean of the set of all the values. In this embodiment, the basis parameters (which are character independent) of the ML trained PCGM are compressed using scalar quantization, as described above.

At 706, character-dependent mean vector parameters of the ML-trained PCGM are transformed by training the PCGM under minimum classification error (MCE) criterion using the compressed character-independent basis matrices parameters. For example, as described above in FIG. 3, the mean vector parameters of the PCGM are transformed during MCE training. That is, the misclassification measure can be defined for respective training samples using a discriminant function of the PCGM and a decision rule, and the Quickprop algorithm can be used to transform the mean vectors for the PCGM, starting with the ML trained PCGM parameters.

At 708, the transformed mean vectors can be compressed using the split VQ technique, as described above, for example, in FIG. 4. For example, the mean vectors can be split into a plurality streams of sub-vectors, and the sets of sub-vectors from each stream can be grouped into clusters. In this example, the mean vector can be represented by multiple indices, which correspond to an index of a codeword (e.g., centroid) to which the corresponding sub-vector has been quantized (e.g., clustered). Further, the respective codewords can be organized in codebooks for each stream, for example, and the codebooks and indices can be stored in computer memory for use as a PCGM-based handwriting recognizer.

Having compressed the parameters vectors, the exemplary method 700 ends at 710.

In one aspect, if all the model parameters are updated by MCE training, model compression can be performed after completion of MCE training. However, in one embodiment, because merely the mean vectors are updated in the MCE training, the MCE training and the model parameter compression can be combined. In this embodiment, character-dependent coefficients for the ML-trained PCGM can be compressed using split VQ, for example, such as the coefficients $\{\lambda_{jl}\}$ as described above in FIG. 4. Further, in one embodiment, a set of character-dependent constants for the ML-trained PCGM can be compressed using scalar quantization, such as the prototypes $\psi$ was described above in FIG. 4.

Further, the character-dependent mean vector parameters of the ML-trained PCGM are transformed by training the PCGM under minimum classification error (MCE) criterion using the compressed character-independent basis matrices parameters and character-dependent coefficients. For example, as shown in FIG. 3, the mean vector parameters of the PCGM can be transformed during MCE training. That is, the misclassification measure can be defined for respective training samples using a discriminant function of the PCGM and a decision rule, and the Quickprop algorithm can be used to transform the mean vectors for the PCGM, starting with the ML trained PCGM parameters.

Further, in this aspect, in one embodiment, the MCE training can be used to fine-tune the mean vectors where a compressed precision matrix is used to calculate a discriminant function for the PCGM. For example, the MCE training can be invoked to fine-tune the mean vectors $\{\mu_j\}$, where the compressed precision matrix $$\hat{P}_j = \sum_{l=1}^{L} \hat{\lambda}_{jl} \hat{S}_l$$

is used to calculate the PCGM's discriminant function, as described above in FIG. 3. After MCE training of the mean vectors $\{\mu_j\}$, the parameter vectors of the mean vectors can be transformed as $m_j = \hat{P}_j \mu^*_j$.

Additionally, in this embodiment, the transformed mean vectors can be compressed using the split VQ technique, as described above, for example, in FIG. 4. For example, the mean vectors can be split into a plurality streams of sub-vectors, and the sets of sub-vectors from each stream can be grouped into clusters. In this example, the mean vector can be represented by multiple indices, which correspond to an index of a codeword (e.g., centroid) to which the corresponding sub-vector has been quantized (e.g., clustered). Further, the respective codewords can be organized in codebooks for each stream, for example, and the codebooks and indices can be stored in computer memory for use as a PCGM-based handwriting recognizer.

Further, in one embodiment, the character-dependent constants can be updated using values of mean vectors before and after MCE training by $c_j \leftarrow c_j + \bar{\mu}_j^T \hat{P}_j \bar{\mu}_j - (\mu^*_j)^T \hat{P}_j \mu^*_j$, where $\bar{\mu}_j$ and $\mu^*_j$ denote values of the mean vector before and after MCE training, respectively. They can be further compressed using scalar quantization.

Figure 8:
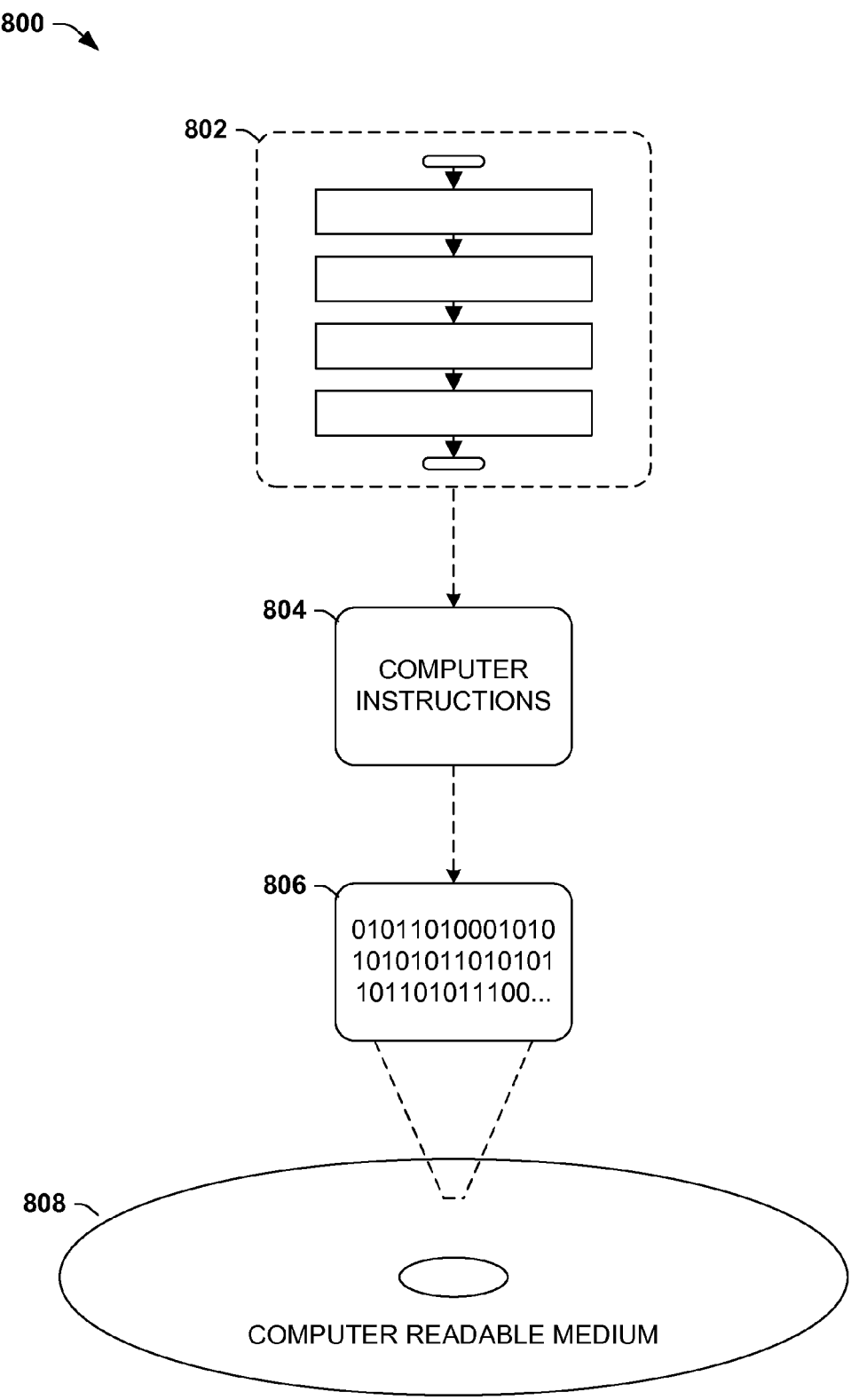
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as the exemplary method 200 of FIG. 2, or exemplary method 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
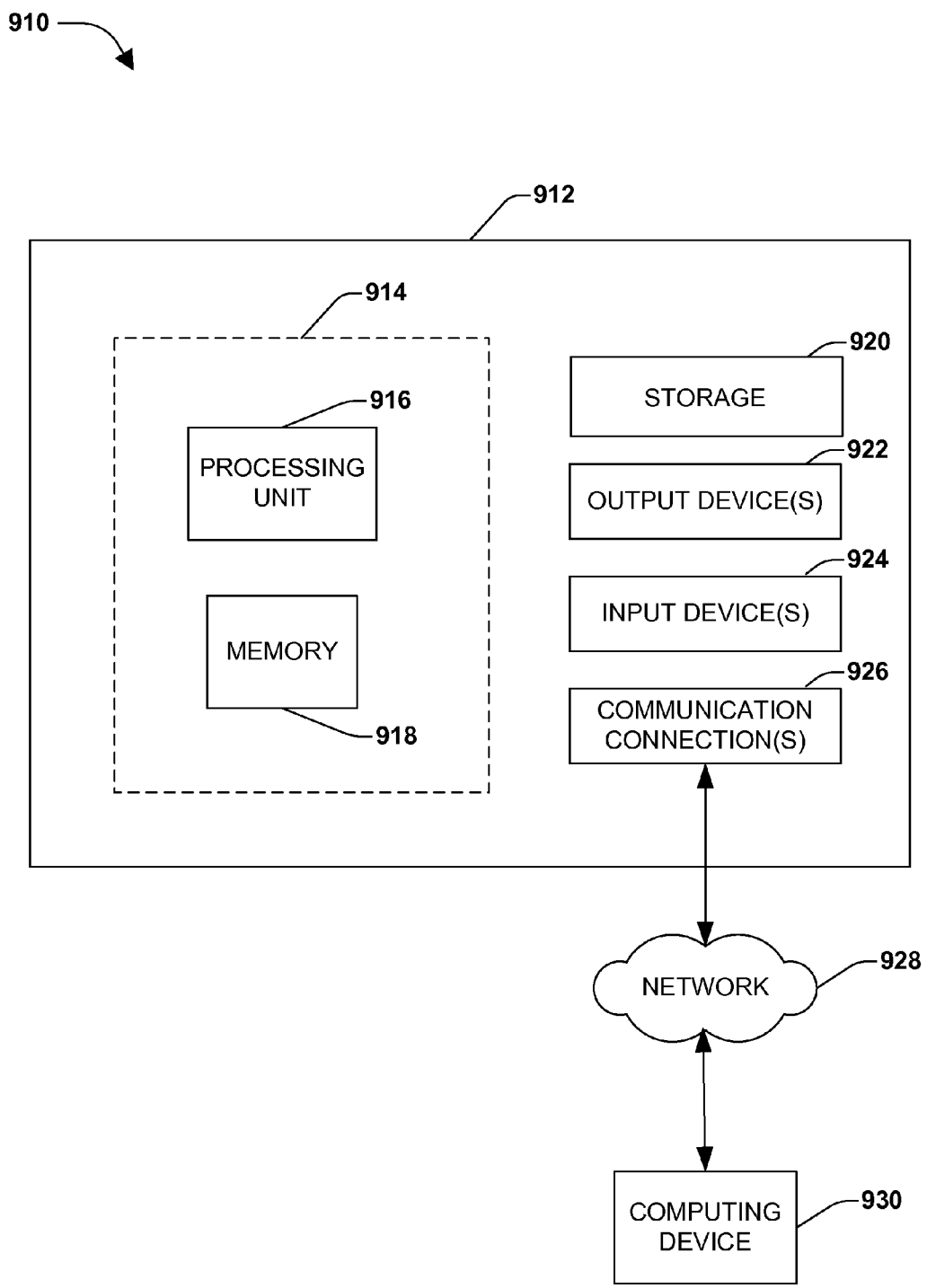
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally, be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for constructing a compact handwriting character classifier, comprising:
    training a precision constrained Gaussian model (PCGM) based handwriting classifier by using a computer-based processor to estimate parameters for the PCGM under minimum classification error (MCE) criterion; and
    compressing the parameters of the trained PCGM classifier using split vector quantization (VQ) to compact the handwriting recognizer in computer-based memory.

2. The method of claim 1, the training comprising defining a misclassification measure for respective training samples using a discriminant function of the PCGM and a decision rule.

3. The method of claim 2, the training comprising:
    defining an empirical loss function using one or more misclassification measures of the training samples; and
    estimating the parameters for the PCGM by minimizing the empirical loss function for the parameters of the PCGM.

4. The method of claim 3, minimizing the empirical loss function using a Quickprop algorithm.

5. The method of claim 1, the training comprising transforming merely mean vectors for the PCGM using a Quickprop algorithm starting with maximum likelihood (ML) trained PCGM parameters.

6. The method of claim 5, transforming mean vectors for the PCGM using the Quickprop algorithm comprising:
    calculating a first derivative of the empirical loss function for respective mean vectors;
    performing a first update of the mean vectors using a combination of the first derivative and a first learning rate;
    calculating a second derivative of the empirical loss function for respective mean vectors;
    performing a second update of the mean vectors by combining the first and second derivative if the second derivative is greater than zero and has a different sign of gradient than the first derivative;
    performing a second update of the mean vectors by combining the first derivative, the second derivative, and a second learning rate, if the second derivative is greater than zero and has a same sign of gradient as the first derivative; and
    otherwise, combining the first derivative with the second learning rate to perform a second update of the mean vectors.

7. The method of claim 1, compressing the parameters of the trained PCGM classifier using split VQ comprising:
    splitting a parameter vector into two or more streams of sub-vectors;

grouping a set of sub-vectors from a stream into clusters using the Linde-Buzo-Gray (LBG) algorithm;
representing the parameter vector by multiple indices, respectively corresponding to an index of a codeword to which a corresponding sub-vector is quantized; and
storing indices and a codebook created by the LBG algorithm in computer-based memory.

8. The method of claim 7, comprising one or more of:
compressing a set of character-dependent transformed mean vectors for the PCGM;
compressing a set of character-dependent coefficients for the PCGM; or
compressing a set of character-dependent constants using scalar quantization.

9. The method of claim 1, compressing the parameters of the trained PCGM classifier comprising:
storing diagonal items from a set of character-independent symmetrical basis matrices for the PCGM in computer-based memory; and
compressing upper-diagonal items from the set of character-independent symmetrical basis matrices for the PCGM using scalar quantization.

10. The method of claim 9, comprising storing indices and one or more codebooks for scalar quantization in computer-based memory.

11. A computer-based method for constructing a compact handwriting recognizer, comprising:
compressing character-independent basis parameters of a maximum likelihood (ML) trained precision constrained Gaussian model (PCGM) using scalar quantization;
transforming character-dependent mean vector parameters of the ML-trained PCGM by using a computer-based processor to train the PCGM under minimum classification error (MCE) criterion using the compressed character-independent basis parameters for the ML-trained PCGM; and
compressing the transformed mean vector parameters using split vector quantization (VQ) to create a compact handwriting recognizer in computer-based memory.

12. The method of claim 11, comprising one or more of:
compressing character-dependent coefficients for the ML-trained PCGM using split vector VQ; or
using the compressed character-dependent coefficients to train the PCGM under MCE criterion.

13. The method of claim 11, comprising:
updating character-dependent constants using values of mean vectors before and after MCE training; and
compressing the updated constants using scalar quantization.

14. The method of claim 11, transforming mean vector parameters comprising using MCE training to fine-tune the mean vectors where a compressed precision matrix is used to calculate a discriminant function for the PCGM.

15. The method of claim 13, MCE training comprising defining a misclassification measure for respective training samples using a discriminant function of the PCGM and a decision rule.

16. The method of claim 11, the training the PCGM under MCE criterion comprising merely transforming mean vectors for the PCGM using a Quickprop algorithm starting with the ML trained PCGM parameters.

17. The method of claim 11, comprising storing merely a set of basis parameters common to respective character classes for the PCGM.

18. The method of claim 17, storing merely a set of basis parameters comprising storing:
a set of coefficients for the PCGM; and
a set of symmetrical prototypes for the PCGM.

19. The method of claim 11, comprising:
storing diagonal items from a set of character-independent symmetrical basis matrices for the PCGM in computer-based memory; and
compressing upper-diagonal items from the set of character-independent symmetrical basis matrices for the PCGM using scalar quantization.

20. A computer-based method for constructing a compact handwriting recognizer, comprising:
compressing character-independent basis matrices parameters, comprising a set of prototypes, of a maximum likelihood (ML) trained precision constrained Gaussian model (PCGM) using scalar quantization;
compressing character-dependent coefficients for the ML-trained PCGM using split vector quantization (VQ);
transforming merely mean vectors for respective character classes of the ML trained PCGM using a computer-based processor, comprising:
training the PCGM under a minimum classification error (MCE) criterion using the compressed basis parameters to fine tune the mean vectors, where a compressed precision matrix is used to calculate a discriminant function for the PCGM; and
transforming mean vectors for the PCGM using a Quickprop algorithm;
updating character-dependent constants using values of mean vectors before and after MCE training;
compressing the updated constants using scalar quantization; and
compressing the transformed mean vectors using split vector quantization to create a compact handwriting recognizer in computer-based memory, comprising:
splitting a parameter vector into two or more streams of sub-vectors;
grouping a set of sub-vectors from a stream into clusters using the Linde-Buzo-Gray (LBG) algorithm;
representing the parameter vector by multiple indices, respectively corresponding to an index of a codeword to which a corresponding sub-vector is quantized; and
storing indices and a codebook created by the LBG algorithm in computer-based memory.

* * * * *

UNITED STATES PATENT AND TRADEMARK OFFICE
CERTIFICATE OF CORRECTION

PATENT NO. : 8,369,611 B2  Page 1 of 1
APPLICATION NO. : 12/765247
DATED : February 5, 2013
INVENTOR(S) : Huo et al.

It is certified that error appears in the above-identified patent and that said Letters Patent is hereby corrected as shown below:

In the Specification

Column 7, line 11, delete "aren" and insert -- are --, therefor.

Column 7, line 12, delete "Tis" and insert -- T is --, therefor.

Column 7, line 40, delete "{mi," and insert -- {mj, --, therefor.

Column 10, line 22, delete "was" and insert -- as --, therefor.

Signed and Sealed this
Tenth Day of February, 2015

Michelle K. Lee
*Deputy Director of the United States Patent and Trademark Office*